(12) United States Patent
Ramalingam et al.

(10) Patent No.: US 8,327,022 B2
(45) Date of Patent: Dec. 4, 2012

(54) METHOD AND APPARATUS FOR UPDATING A DOMAIN NAME SERVER

(75) Inventors: Kavitha Ramalingam, Karnataka (IN); Prithvi Srihari, Bangalore (IN); Vasu Vallabhaneni, Austin, TX (US); Venkat Venkatsubra, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 332 days.

(21) Appl. No.: 11/539,897

(22) Filed: Oct. 10, 2006

(65) Prior Publication Data
US 2008/0086556 A1 Apr. 10, 2008

(51) Int. Cl.
*G06F 15/16* (2006.01)
(52) U.S. Cl. ........ 709/245; 709/203; 709/222; 709/226; 370/328
(58) Field of Classification Search .......... 709/245, 709/203, 222, 226; 370/328
See application file for complete search history.

(56) References Cited

U.S. PATENT DOCUMENTS

| | | | |
|---|---|---|---|
| 7,000,016 B1* | 2/2006 | Vanderbeck et al. | 709/226 |
| 7,574,508 B1* | 8/2009 | Kommula | 709/226 |
| 2002/0035624 A1* | 3/2002 | Kim | 709/222 |
| 2004/0133634 A1* | 7/2004 | Luke et al. | 709/203 |
| 2005/0080927 A1 | 4/2005 | Anderson et al. | |
| 2005/0086373 A1 | 4/2005 | Banerjee et al. | |
| 2005/0262248 A1 | 11/2005 | Jennings, III et al. | |
| 2006/0002327 A1* | 1/2006 | Kallio et al. | 370/328 |
| 2006/0155563 A1 | 7/2006 | Banerjee et al. | |
| 2007/0050446 A1* | 3/2007 | Moore | 709/203 |

FOREIGN PATENT DOCUMENTS
EP 1571798 A2 9/2005

OTHER PUBLICATIONS

Wilkinson et al., "Enhanced Secure Dynamic DNS Update with Indirect Route", Information Assurance Workshop, 2004, Proceedings from the Fifth Annual IEEE SMC, West Point, NY, USA Jun. 10-11, 2004, Piscataway, N J, USA, IEEE, pp. 335-341, XP010802579, ISBN: 0-7803-8572-1.*
Wilkinson et al., "Enhanced Secure Dynamic DNS Update with Indirect Route", Information Assurance Workshop, 2004, Proceedings from the Fifth Annual IEEE SMC, West Point, NY, USA Jun. 10-11, 2004, Piscataway, NJ, USA, IEEE, pp. 335-341, XP010802579, ISBN: 0-7803-8572-1.
U.S. Appl. No. 11/181,416, filed Jul. 14, 2005, Banerjee et al.
Mar, "Load Balancing", Load Balancing Servers, pp. 1-11, retrieved Jul. 14, 2006. http://www.wilsomar.com/1loadbal.htm.

* cited by examiner

*Primary Examiner* — Ario Etienne
*Assistant Examiner* — Michael C Lai
(74) *Attorney, Agent, or Firm* — Yee & Associates, P.C.; Steven L. Bennett

(57) ABSTRACT

A computer implemented method, apparatus, system, and computer usable program code for updating a domain name server. In response to detecting a failed network interface in a plurality of network interfaces on a content server, the content server identifies an IP address for the failed network interface. The content server notifies a domain name server that the IP address for the failed network interface is an unreachable IP address. The domain name server does not provide the unreachable IP address to a querying client.

9 Claims, 6 Drawing Sheets

METHOD AND APPARATUS FOR UPDATING A DOMAIN NAME SERVER

BACKGROUND OF THE INVENTION

1. Field of the Invention

The present application is related generally to a data processing system and in particular to a method and apparatus for a domain name server. More particularly, the present application is directed to a computer implemented method, apparatus, system, and computer usable program code for updating a domain name server (DNS) to return IP addresses for server interfaces that are reachable.

2. Description of the Related Art

Every computer on the Internet has a unique identifying number called an Internet Protocol (IP) address. An IP address is generally expressed as a decimal number, such as 216.27.62.139. Thus, every computer on the Internet can be identified and contacted using the unique IP address for the computer. However, it would be very difficult for human users to remember an IP address for every web site that a user wants to access. Therefore, humans use domain names.

A domain name is a human-readable host name to stand in for an IP address identifying a particular machine on the Internet. In other words, a domain name is an alphanumeric representation of a particular IP address. For example, "IBM.com" and "wikipedia.org" are domain names. The domain name "IBM.com" is easier for a human to remember than an IP address for one of the servers for International Business Machines, Inc. Moreover, an IP address for a particular machine might change quite frequently, while the domain name generally remains the same regardless of changes in the IP address.

A domain name server (DNS) is an Internet service that translates human readable domain names into IP addresses. When a client wants to access a web page on a server, the client contacts a domain name server to request an IP address corresponding to a given domain name. The domain name server generally responds by providing the IP address for the domain name or providing an IP address for another domain name server that might know the correct IP address.

The domain name server makes it possible to attach easy-to-remember domain names, such as "IBM.com" and "wikipedia.org", to hard-to-remember IP addresses, (such as 207.142.131.206). Moreover, in any given Internet session, a user will typically require domain name server services dozens or even hundreds of times to obtain needed IP addresses. These domain name server queries take place transparently in client applications such as web browsers, mail clients, and other Internet applications.

A content server is a server providing content or services to a user. To access a content server, a client needs an IP address to access a network interface on the content server. A network interface is any hardware and/or software components providing a point of interconnection between a user or client terminal and another computer on a network, such as the Internet. Content servers are often multi-homed to improve reliability and availability of the content and services provided by the content server. A multi-homed server is a server that has multiple network interfaces, each with a different IP address associated with the interface. When a client wishes to access the content server using the content server's domain name, the domain name server is queried. This query is called a lookup. The domain name server then provides all the IP addresses for the content server to the client.

Typically, the client uses the first IP address that is provided by the domain name server to access the content server. The client expects that the first IP address is a reachable IP address. If the client cannot connect with the content server using the first IP address, the client does not attempt to connect using any other IP address for the content server. In other words, the client assumes the IP address provided by the domain name server can be used to reach a functional network interface on the content server. However, if the network interface corresponding to the IP address provided by the domain name server has failed for any reason, the IP address provided by the domain name server will not enable the client to access the content server.

Currently, domain name servers provide IP addresses for a given content server in random order, with the order varying with each lookup, in order to improve the probability that a reachable IP address will be provided to a client. However, this method can still result in the provision of unreachable IP addresses to clients in response to lookup queries.

SUMMARY OF THE INVENTION

The illustrative embodiments provide a computer implemented method, apparatus, system, and computer usable program code for updating a domain name server. A content server monitors a plurality of network interfaces on the content server. In response to detecting a failed network interface in the plurality of network interfaces, the content server identifies an IP address for the failed network interface.

The content server notifies a domain name server that the IP address for the failed network interface is an unreachable IP address by sending a domain name server update to the domain name server. The domain name server update includes the unreachable IP address. In one embodiment, the domain name server update is a secure domain name server update.

The domain name server update notifies the domain name server that the IP address for the failed network interface no longer corresponds to the content server. A failed network interface includes a network interface that is down or a network interface that cannot be used to reach a gateway.

The domain name server ceases to provide the unreachable IP address to a querying client. The domain name server either removes the unreachable IP address from a list of IP addresses for the content server or moves the unreachable IP address to a last IP address in a list of IP addresses for the content server.

In response to determining that the failed network interface is repaired, the content server sends a domain name server update to the domain name server. The domain name server update includes an IP address for the repaired network interface to form a reachable IP address. Likewise, the domain name server sends a domain name server update to the domain name server in response to detecting a new network interface added to the plurality of network interfaces. The domain name server update includes an IP address for the new network interface to form a reachable IP address.

In response to receiving a domain name server update that includes a reachable IP address, the domain name server adds the reachable IP address to the list of IP addresses for the content server. If the reachable IP address is already included in the list of IP addresses as a last IP address entry, the domain name server moves the reachable IP address from the last IP address in the list of IP addresses to a first IP address in the list of IP addresses.

In one embodiment, an operating system sends a domain name server update including the unreachable IP address to the domain name server in response to receiving an interrupt signal from the failed network interface.

In another embodiment, a client computer sends a domain name server update to the domain name server identifying an IP address for a content server that is an unreachable IP address in response to a failure to connect with a content server using the IP address. The domain name server stops providing the unreachable IP address to querying clients.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
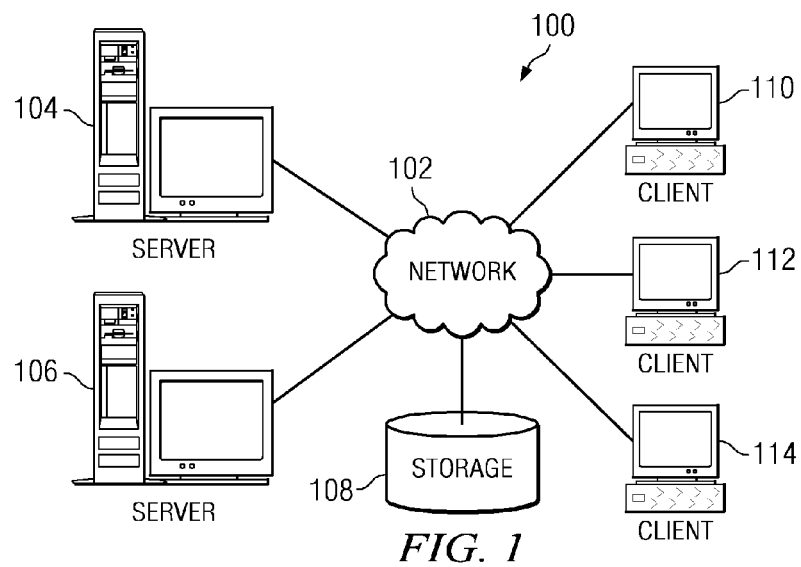
FIG. 1 is a pictorial representation of a network of data processing systems in which aspects of the illustrative embodiments may be implemented.

With reference now to the figures, FIG. 1 depicts a pictorial representation of a network of data processing systems in which aspects of the illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In accordance with the aspects of the illustrative embodiments, server 104 and 106 are web service servers. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In accordance with this illustrative example, clients 110, 112, and 114 transmit a web service request to a server, such as servers 104 and 106 via network 102. In response, web service server, such as servers 104 and 106, send a web service response to the client requester, such as clients 110, 112, and 114 via network 102.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

Figure 2:
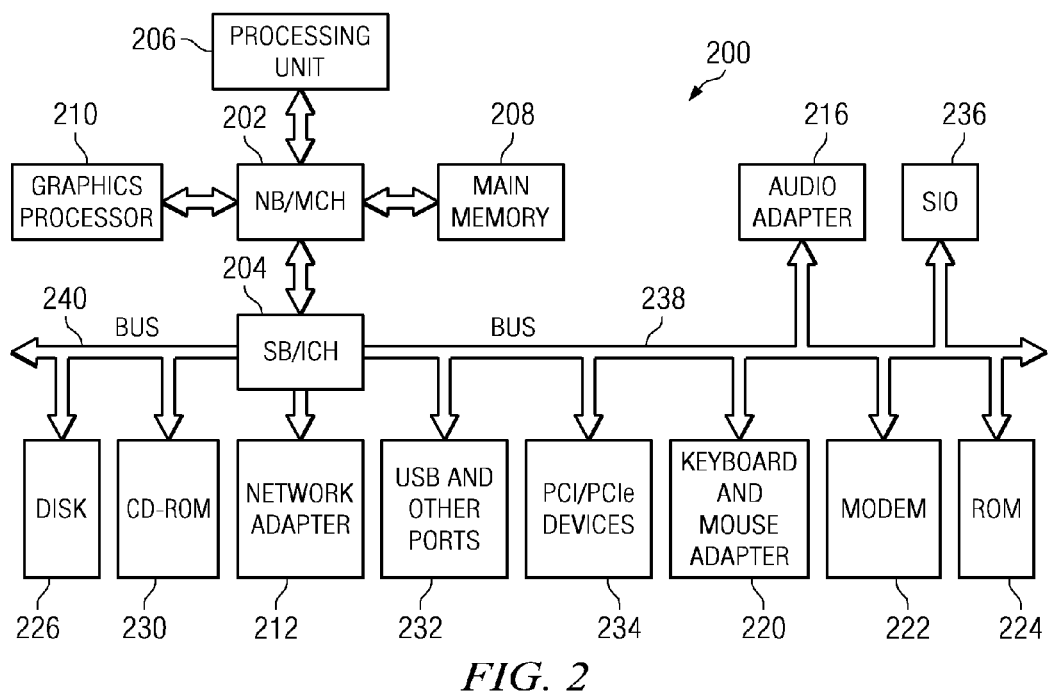
FIG. 2 is a block diagram of a data processing system in which aspects of the illustrative embodiments may be implemented.

With reference now to FIG. 2, a block diagram of a data processing system is shown in which aspects of the illustrative embodiments may be implemented. Data processing system 200 is an example of a computer, such as server 104 or client 110 in FIG. 1, in which computer usable code or instructions implementing the processes for the different embodiments may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

Hard disk drive 226 and CD-ROM drive 230 connect to SB/ICH 204 through bus 240. Hard disk drive 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java® programming system, may run in conjunction with the operating system and provides calls to the operating system from Java® programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pseries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disc drive 226, and may be loaded into main memory 208 for execution by processing unit 206. The processes for embodiments are performed by processing unit 206 using computer usable program code, which may be located in a memory such as, for example, main memory 208, ROM 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course, the bus system may be implemented using any type of communication fabric or architecture that provides for a transfer of data between different components or devices attached to the fabric or architecture. A communication unit may include one or more devices used to transmit and receive data, such as modem 222 or network adapter 212 of FIG. 2. A memory may be, for example, main memory 208, ROM 224, or a cache such as found in NB/MCH 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Currently, the most commonly employed method of transferring data over the Internet is to employ the World Wide Web environment, also called simply "the Web". In the web environment, servers and clients, such as servers 104 and 106 and clients 110-114 in FIG. 1, effect data transaction using the Hypertext Transfer Protocol (HTTP), a known protocol for handling the transfer of various data files. Examples of these types of data files include text, still graphic images, audio, and motion video. The information in various data files is formatted for presentation to a user by a standard page description language, the Hypertext Markup Language (HTML) or Extensible Markup Language (XML).

Every computer on the Internet has a unique identifying number called an Internet Protocol (IP) address. Every computer on the Internet can be identified and contacted by using the IP address for the computer. For example, if a user wants to access content on a server web page, the user at a client can use the IP address for the server computer to connect to that server and access the server's content. However, it would be very difficult for human users to remember an IP address for every web site that a user wants to access. Therefore, humans use domain names. A domain name is a human-readable host name to stand in for an IP address identifying a particular machine on the Internet.

A domain name server (DNS) is an Internet service that translates human readable domain names into IP addresses. When a client wants to access a web page on a server, the client contacts a domain name server to request an IP address corresponding to a given domain name. The domain name server generally responds by providing the IP address for the domain name or providing an IP address for another domain name server that might know the correct IP address for the domain name.

A content server is a server providing content or services to a user. A content server includes, but is not limited to, a web server, an e-mail server, a file transfer protocol (FTP) server, and/or an application server. In order to access a content server, a client must have an IP address to access a network interface on the server. As used herein, a network interface is any hardware and/or software providing a point of interconnection or interface between a user or client terminal and another machine on a network, such as the Internet. In other words, a network interface is the hardware and/or software that is designed to allow one computer to communicate with another computer over a computer network. A network interface is also referred to as a network adapter, a network card, and/or a network interface card.

If a machine only has a single network interface and that network interface is unreachable, a user will be unable to access the machine. Therefore, content servers are often multi-homed to improve reliability and availability of the content and services provided by the content server.

A multi-homed server is a server that has multiple network interfaces, each with a different IP address associated with the interface. When a client wishes to access the content server using the content server's domain name, the client sends a lookup query to the domain name server. The domain name server then provides all the IP addresses for the content server to the client. The domain name server provides all the IP addresses for a given domain name that have been added to the domain name server.

Typically, the client uses the first IP address that is provided by the domain name server to access the content server. The client expects that the IP address provided by the domain name server is a reachable IP address. In other words, the client assumes the IP address can be used to reach a functional network interface on the content server. However, if the network interface corresponding to the IP address provided by the domain name server is faulty or if the network link at the content server side is unavailable for any reason, the address provided by the domain name server will not enable the client to access the content server.

Currently, domain name servers provide IP addresses for a given content server in the order they are listed in the domain name server data base or in a round robin method. A domain name server provides IP addresses in either a listed order or in a round robin based on how the domain name server is configured.

In some domain name servers, the order in which a domain name server provides IP addresses for a given domain name is varied with each lookup. In other words, the IP addresses are not provided in the same order in response to different lookup queries to improve the probability that a reachable IP address will be provided to a client. However, the illustrative embodiments recognize that this method can still result in the provision of unreachable IP addresses to clients in response to lookup queries. The different embodiments recognize the need to improve the probability that a domain name server query returns IP addresses that are reachable.

Therefore, the illustrative embodiments provide a computer implemented method, apparatus, system, and computer usable program code for updating a domain name server. A content server monitors a plurality of network interfaces on the content server. In response to detecting a failed network interface in the plurality of network interfaces, the content server identifies an IP address for the failed network interface. The content server notifies a domain name server that the IP address for the failed network interface is an unreachable IP address by sending a domain name server update that includes the unreachable IP address to the domain name server. In one embodiment, the domain name server update is a secure domain name server update.

The domain name server ceases to provide the unreachable IP address to a querying client. The domain name server either removes the unreachable IP address from a list of IP addresses for the content server or moves the unreachable IP address to a last IP address in a list of IP addresses for the content server.

In response to determining that the failed network interface is repaired, the content server sends a domain name server update to the domain name server. The domain name server update includes an IP address for the repaired network interface to form a reachable IP address. Likewise, the domain name server sends a domain name server update to the domain name server in response to detecting a new network interface added to the plurality of network interfaces. The domain name server update includes an IP address for the new network interface to form a reachable IP address.

In response to receiving a domain name server update that includes a reachable IP address, the domain name server adds the reachable IP address to the list of IP addresses for the content server. If the reachable IP address is already included in the list of IP addresses as a last IP address entry, the domain name server moves the reachable IP address from the last IP address in the list of IP addresses to a first IP address in the list of IP addresses.

In another embodiment, a client computer sends a domain name server update to the domain name server identifying an IP address for a content server that is an unreachable IP address in response to a failure to connect with a content server using the IP address. The domain name server stops providing the unreachable IP address to querying clients.

In another embodiment, the domain name server receives a domain name server update from a client, rather than from the content server. The domain name server update includes an unreachable IP address for the content server. The domain name server ceases to provide the unreachable IP address to querying clients.

Figure 3:
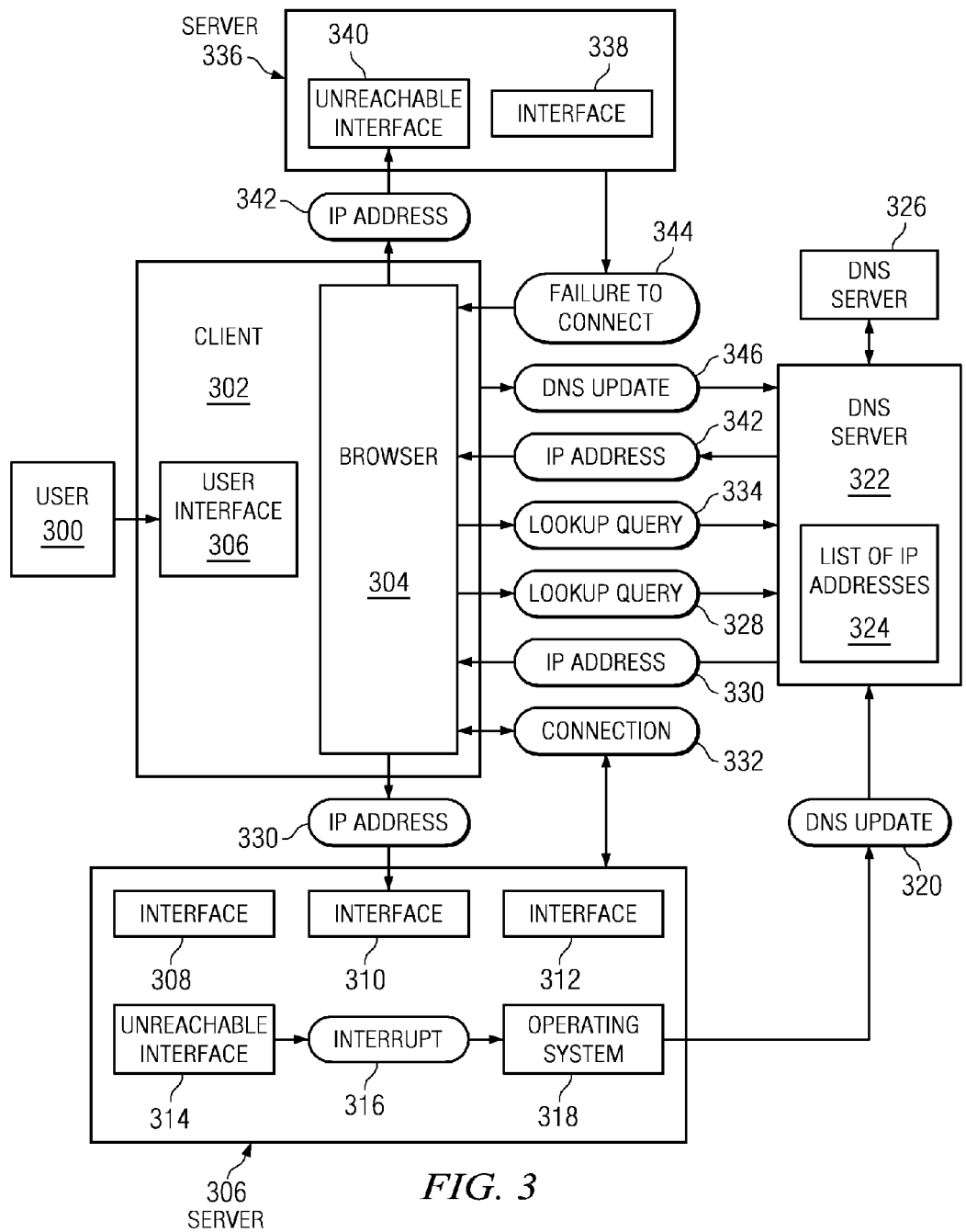
FIG. 3 is a block diagram illustrating a data flow during a domain name server update in accordance with an illustrative embodiment.

Turning now to FIG. 3, a block diagram illustrating a data flow during a domain name server update is depicted in accordance with an illustrative embodiment. When user 300 at client 302 wants to access content and/or services available on a content server, user 300 enters a domain name corresponding to the desired content server into browser 304 by means of user interface 306.

Client 302 is any known or available client computing device, including but not limited to, a desktop computer, a laptop computer, a personal digital assistant (PDA), a notebook computer, a cell phone, a smart watch, and/or any other device to enable a user to access a network. In this illustrative example, client 302 is a client computer, such as clients 110-114 in FIG. 1.

Browser 304 may be any known or available software for enabling a client to access content and/or services on a network. For example, browser 304 can be implemented using browser software such as, for example, Microsoft® Explorer and Netscape® Navigator.

User interface 306 may be implemented using any type of known or available interface for providing input to client 302, including but not limited to, a graphical user interface (GUI), a menu-driven interface, and/or a command line interface.

User 300 enters a domain name for a network site associated with server 306. Server 306 is any type of server, such as server 104 and 106 in FIG. 1. Server 306 can be a server on a network, such as network 102 described in FIG. 1. Server 306 is a multi-homed server having multiple network interfaces. Client 302 accesses resources, such as web pages, files, and services on server 306 through a network connection via one of the network interfaces on server 306, such as network interface 308, 310, 312, and 314.

Network interfaces 308, 310, 312, and 314 are interfaces to allow or control access to another computer and/or another computer network. Network interfaces 308, 310, 312, and 314 include hardware and/or software that is designed to allow one computer to communicate with another computer over a computer network. A network interface, such as network interfaces 308, 310, 312, and 314, is also referred to as a network adapter, a network card, and/or a network interface card.

Server 306 monitors the set of interfaces, including network interfaces 308, 310, 312, and 314, to detect any failure in one or more of the network interfaces. If a failure occurs a network interface, the failed network interface is an unreachable interface.

In this illustrative example, interface 314 is an unreachable interface. User 300 cannot connect to server 306 using an IP address for interface 314 because interface 314 is a failed network interface. A network interface can fail due to a number of reasons, such as a hardware failure, a router connected to the network interface card (NIC) is down, or a network cable becomes disconnected.

When interface 314 fails and becomes an unreachable interface, interface 314 raises an interrupt signal, such as interrupt 316. Operating system 318 for server 306 detects interrupt 316 and determines that interface 314 has failed.

Operating system 318 sends a domain name server (DNS) update 320 to domain name server 322. In these illustrative examples, domain name server update 320 can be either a secure domain name server update or an unsecured domain name server update. Whether domain name server update 320 is a secure domain name server update or an unsecured domain name server update depends upon how the domain name server is configured. Domain name server update 320 may be made secure by means of any known or available security protocols, including, but not limited to, Internet Protocol security (IPsec) and domain name server security (DNS-Sec). IPsec is a standard framework for securing Internet protocol communications. DNS-Sec is a standard domain name server security protocol.

Domain name server update 320 notifies domain name server 322 that an IP address for interface 314 is an unreachable IP address. In other words, domain name server update 320 informs domain name server 322 that a client cannot access server 306 using an IP address for unreachable interface 314. Domain name server update 320 is sent to domain name server 322 through an operable network interface on server 306, such as interface 308, 310, or 312.

Domain name server 322 maintains list of IP addresses 324 for server 306. List of IP addresses 324 is a list of all the IP addresses for contacting the set of network interfaces located on server 306. In response to receiving domain name server update 320 notifying domain name server 322 that interface 314 is an unreachable interface, domain name server 322 ceases to provide an IP address for unreachable interface 314 to clients. Domain name server 322 ceases providing the IP address for unreachable interface 314 to clients by removing the IP address from list of IP addresses 324.

In an alternative embodiment, domain name server 322 moves the IP address for unreachable interface 314 to a last IP address in list of IP addresses 324. Typically, a client receiving list of IP addresses 324 will use the first IP address on the list. In this case, because the IP address for unreachable interface 314 is located at the end of list of IP addresses 324, the client will not use the IP address for unreachable interface 314.

Thus, when browser 304 receives a domain name corresponding to server 306 from user 300, browser 304 sends lookup query 328 to domain name server 322 to request an IP address for the domain name. In response, domain name server 322 sends IP address 330 to browser 304. IP address 330 corresponds to one of the network interfaces on server 306.

In this illustrative example, IP address 330 corresponds to interface 310. Client 302 uses IP address 330 to create connection 332 with server 306. Client 302 uses connection 332 to request content and/or services from server 306. Client 302 also uses connection 332 to receive content and/or services from server 306.

If a server fails to update the domain name server regarding a failed network interface, client 302 can send an update to the domain name server providing notification of a failed network interface. For example, browser 304 sends lookup query 334 to domain name server 322 to request an IP address corresponding to server 336.

Server 336 is any type of server, such as server 104 and 106 in FIG. 1. Server 336 can be a server on a network, such as network 102 described in FIG. 1. Server 336 is a multi-homed server having multiple network interfaces, including interfaces 338 and 340. In this illustrative example, interface 340 is an unreachable interface. An unreachable interface is a failed network interface that cannot be used by a client to establish a connection with server 336.

In response to lookup query 334, domain name server 322 sends IP address 342 to client 302. If domain name server 322 does not have a list of IP addresses for the domain name identified in the lookup query, domain name server 322 can query another domain name server for the IP addresses, such as domain name server 326. In the alternative, domain name server 322 can provide browser 304 with an IP address for another domain name server that might have the correct IP address(es), such as domain name server 326. Browser 304 can then use the domain name server IP address to contact the other domain name server 326 to request an IP address for the domain name.

In this example, domain name server 322 provides IP address 342 for server 336. IP address 342 is an IP address for unreachable interface 340. Client uses IP address 342 to attempt to establish a connection over a network with server 336. However, because unreachable interface 340 is a failed network interface, client 302 will experience failure to connect 344. In other words, client 302 will be unable to connect to server 336 using IP address 342.

In response to failure to connect 344, browser 304 sends domain name server update 346 to domain name server 322. Domain name server update 346 includes IP address 342. Domain name server update 346 notifies domain name server 322 that IP address 342 is an unreachable address.

In response to receiving domain name server update 346, domain name server 322 will cease to provide IP address 342 to clients that query domain name server 322 for IP addresses corresponding to server 336. In this example, domain name server 322 removes IP address 342 from a list of IP addresses for server 336. In another embodiment, domain name server 322 moves IP address 342 to a last address entry in the list of IP addresses.

In an alternative embodiment, server 306 continues monitoring the set of network interfaces on server 306. In response to determining that a failed network interface such as unreachable interface 314 is repaired, server 306 notifies domain name server 322 that the IP address for the repaired network interface is now a reachable IP address. Server 306 provides notification to domain name server 322 by means of a secure domain name server update, such as domain name server update 320. Domain name server 322 adds the IP address for the repaired network interface back to the list of IP addresses for the content server. In an alternative embodiment, domain name server 322 moves the IP address for the repaired network interface from the last IP address in the list of IP addresses for the content server to first IP address in the list of IP addresses.

In another illustrative embodiment, server 306 sends a domain name server update to the domain name server that includes an IP address for the new network interface in response to detecting a new network interface added to the plurality of network interfaces. Domain name server 322 then adds the IP address for the new network interface to the list of IP addresses for the content server, such as list of IP addresses 324.

In this example, server 306 monitors the network interfaces on server 306. In another example, server 306 monitors network adapters 309, 311, 313, and 315 associated with network interfaces 308, 310, 312, and 314 to detect if a network adapter goes down or suffers a failure. Server 306 also monitors network adapters 309, 311, 313, and 315 to detect if a gateway for one of the network adapters is unreachable or nonfunctional. If server 306 detects that a network adapter has gone down or a gateway for the network adapter is unreachable, server 306 sends a DNS update to the DNS server notifying the DNS server that an IP address associated with the failed network adapter no longer corresponds to server 306. In other words, server 306 monitors the network adapters on server 306. If one of the network adapters fails, server 306 sends a DNS update to notify the DNS server of the failed network adapter.

Figure 4:
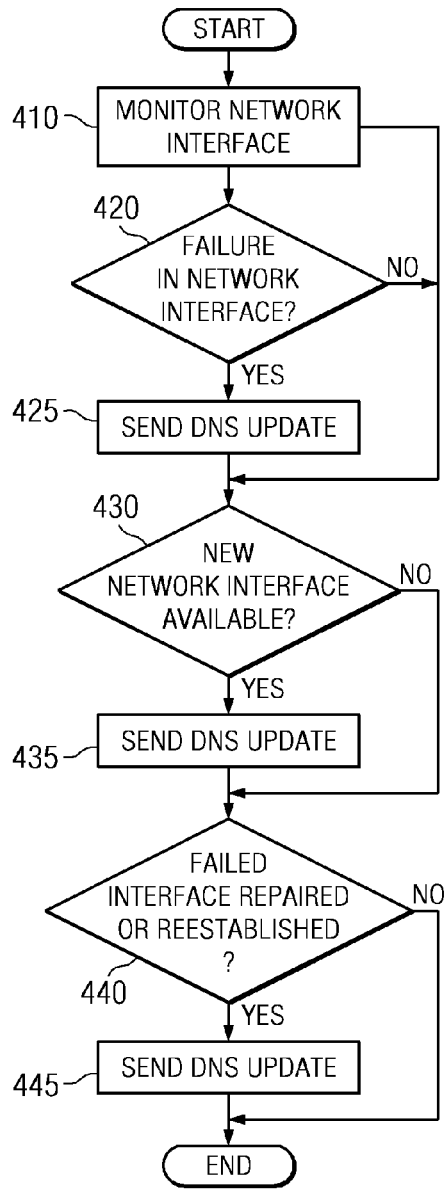
FIG. 4 is a flowchart illustrating a process for a server sending a domain name server update in accordance with an illustrative embodiment.

FIG. 4 is a flowchart illustrating a process for a server sending a domain name server update in accordance with an illustrative embodiment. In the example illustrated in FIG. 4, the process is implemented by a server, such as server 104 or 106 in FIG. 1 or server 306 in FIG. 3.

The content server begins by monitoring multiple network interfaces on the content server (step 410) to detect any failures in any of the network interfaces. If the content server makes a determination that a network interface has failed (step 420), the content server sends a domain name update to a domain name server providing notification to the domain name server that an IP address for the failed network interface no longer corresponds to the content server (step 425). In other words, the content server monitors its network interfaces so that if an interface is down or a gateway cannot be reached using the interface, the content server notifies the domain name server regarding the failed network interface.

If a failure is not detected in a network interface at step 420 or a domain name server update has been sent in step 425, the content server makes a determination as to whether a new network interface has been added and/or is now available on the content server (step 430). If a new network interface is available, the content server sends a domain name server update to the domain name server (step 435). The domain name server update provides notification regarding the new network interface and includes an IP address for the new network interface.

If a new network interface is not available at step 430 or a domain name update has been sent regarding the new network interface at step 435, the content server makes a determination as to whether a failed network interface has been repaired or re-established such that the failed network interface is now operable for connecting a client to the server (step 440). If a failed interface is not repaired, the process terminates thereafter. If a failed interface is repaired, the content server sends a domain name server update to the domain name server (step 445). The domain name server update includes an IP address for the repaired network interface with the process terminating thereafter.

Figure 5:
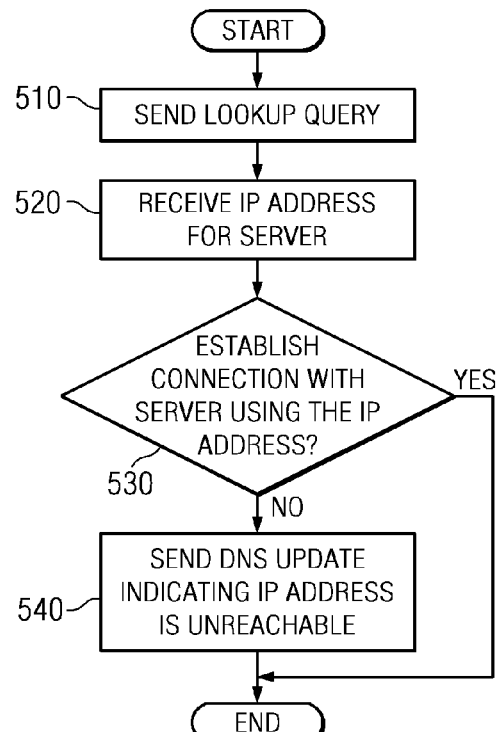
FIG. 5 is a flowchart illustrating a process for a client sending a domain name server update in accordance with an illustrative embodiment.

Turning now to FIG. 5, a flowchart illustrating a process for a client sending a domain name server update is depicted in accordance with an illustrative embodiment. In the illustrative example in FIG. 5, the process can be implemented by a client computer, such as client 110, 112, or 114 in FIG. 1 or client 302 in FIG. 3.

The process begins when a client sends a lookup query to a domain name server (step 510). The client receives an IP address for a content server (step 520). The client makes a determination as to whether a connection with the server can be established using the IP address provided by the domain name server (step 530). If the client determines that a connection can be established, the process terminates thereafter. If the client determines that a connection cannot be established using the IP address, the client sends a domain name server update to the domain name server indicating that the IP address is an unreachable IP address (step 540) with the process terminating thereafter.

Figure 6:
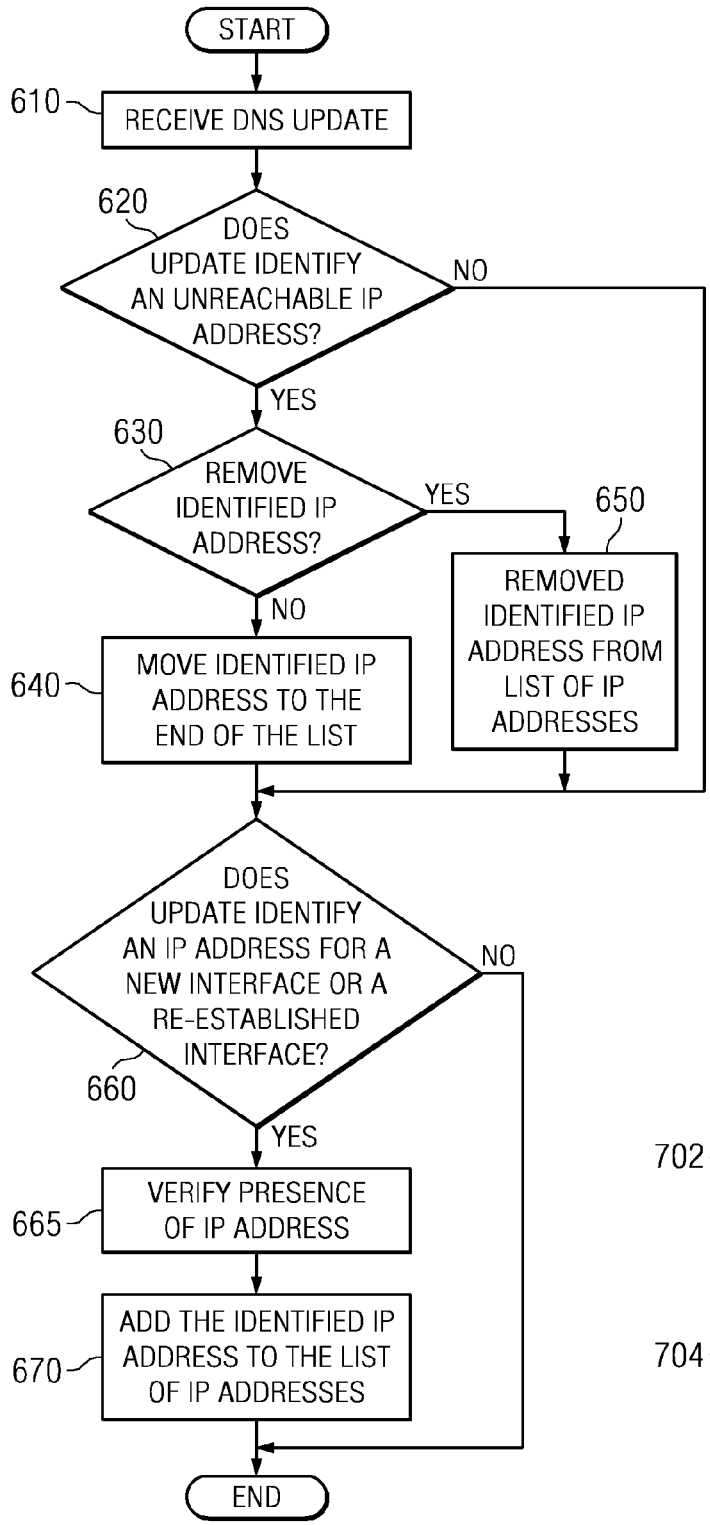
FIG. 6 is a flowchart illustrating a process for a DNS server receiving a domain name server update in accordance with an illustrative embodiment.

FIG. 6 is a flowchart illustrating a process for a domain name server receiving a domain name server update in accordance with an illustrative embodiment. In this illustrative example in FIG. 6, the process is implemented by a domain name server, such as domain name server 322 in FIG. 3.

The process begins when the domain name server receives a domain name server update (step 610) from a client or from a server. The domain name server makes a determination as to whether the domain name server update identifies an unreachable IP address (step 620). If the domain name server update does identify an unreachable IP address, the domain name server makes a determination as to whether to remove the identified IP address from a list of IP addresses for a content server (step 630). If the domain name server determines that the IP address should not be removed from the list of IP addresses, the domain name server moves the unreachable IP address to the end of the list of IP addresses (step 640). If the domain name server determines that the IP address should be removed from the list of IP addresses, the domain name server removes the unreachable IP address from the list of IP addresses (step 650).

The domain name server then makes a determination as to whether the domain name server update identifies an IP address for a new interface or an IP address for a repaired/re-established network interface (step 660). If the domain name server determines that the update does identify an IP address for a new network interface and/or a repaired network interface, the domain name server verifies the presence of the identified IP address (step 665). The domain name server adds the identified IP address to the list of IP addresses for the content server (step 670) with the process terminating thereafter.

Figure 7:
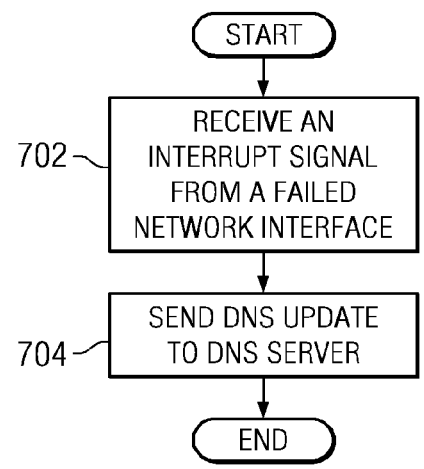
FIG. 7 is a flowchart illustrating a process for an operating system to send a domain name server update in accordance with an illustrative embodiment.

FIG. 7 is a flowchart illustrating a process for an operating system to send a domain name server update in accordance with an illustrative embodiment. In this illustrative example in FIG. 7, the process is implemented by an operating system, such as operating system 318 in FIG. 3.

The operating system receives an interrupt signal from a failed network interface on the content server (step 702). The operating system sends a domain name server update to the domain same server (step 704) notifying the operating system of the failure in the network interface with the process terminating thereafter. The domain name server update includes an IP address for the failed network interface. The IP address for the failed network interface is an unreachable IP address.

Figure 8:
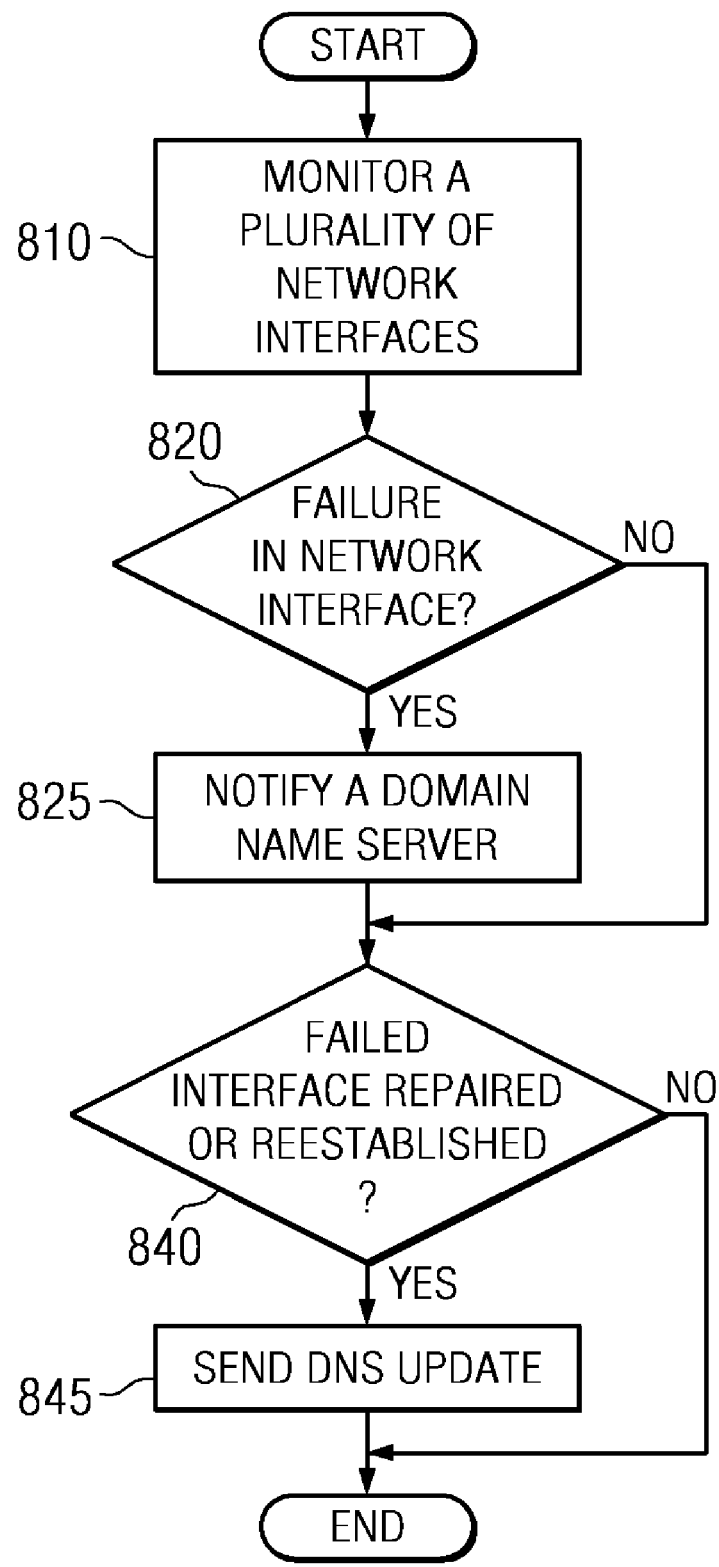
FIG. 8 is a flowchart illustrating a process in accordance with an illustrative embodiment.

FIG. 8 is an illustration of a process. The process begins by monitoring a plurality of network interfaces on a content server (step 810). The process then determines whether there is a failure in the network interface (step 820). If there is not a failure in the network interface, the process moves to step 840. If there is a failure in the network interface, the process notifies a domain name server (step 825). The process then determines whether the failed interface is repaired or reestablished (step 840). If the failed interface is not repaired or reestablished, the process terminates. If the failed interface is repaired or reestablished, a domain name server update is sent (step 845). Thereafter, the process terminates.

Figure 9:
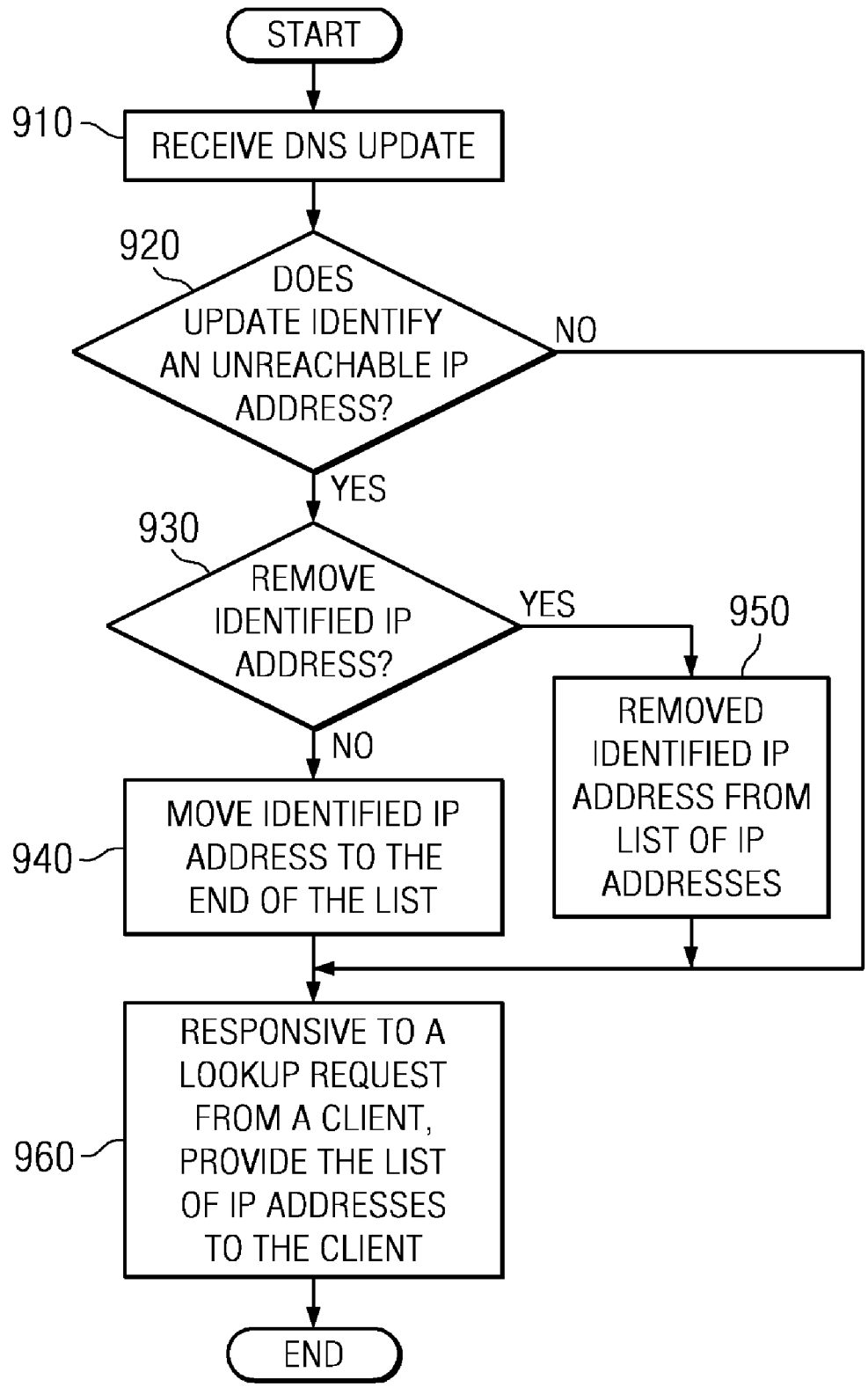
FIG. 9 is a flowchart illustrating an additional process in accordance with an illustrative embodiment.

FIG. 9 is an illustration of a process. The process begins by receiving a domain name server update (step 910). Then the process determines whether the update identifies an unreachable internet protocol address (step 920). If the update does not identify an unreachable internet protocol address, the process moves to step 960. If the update identifies an unreachable internet protocol address, a determination is made as to whether to remove the identified internet protocol address (step 930). If the identified internet protocol address is to be removed, the identified internet protocol address is removed from a list of internet protocol addresses (step 950). Then the process moves to step 960. If the identified internet protocol address is not to be removed, the identified internet protocol address is moved to the end of the list of internet protocol addresses (step 940). The process then provides a list of internet protocol addresses to the client in response to a lookup request from a client (step 960).

Thus, the illustrative embodiments provide a computer implemented method, apparatus, and computer usable program product for updating a list of IP addresses on a domain name server to improve the probability that the domain name server will not provide unreachable IP addresses to clients. The illustrative embodiments permit a server and/or a client to provide a domain name server update to a domain name server regarding an unreachable IP address for a failed network interface, as well as adding reachable IP addresses for newly added network interfaces and repaired/re-established network interfaces. In response to receiving an update indicating an IP address that is an unreachable IP address, the domain name server will remove the unreachable IP address from a list of IP addresses or move the unreachable IP address to the end of the list. In this manner, a client querying the domain name server for an IP address will be less like to receive an unreachable IP address from the domain name server.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the different embodiments have been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for updating a domain name server, the computer implemented method comprising:
   detecting, by a content server, a failure of a first network interface of a plurality of network interfaces of the content server, wherein detecting the failure comprises receiving an interrupt signal from the first network interface, the interrupt signal indicating a hardware failure;
   determining, by the content server, an IP address associated with the first network interface, in response to detecting the failure;
   sending, by the content server, a first domain name server update to a domain name server to notify the domain name server that the IP address is unreachable, in response to determining the IP address associated with the first network interface;
   determining, by the content server, that the first network interface is repaired, wherein determining that the first network interface is repaired comprises determining that the first network interface is operable for connecting a client to the content server; and
   sending, by the content server, a second domain name server update to the domain name server indicating that the IP address is reachable, in response to determining that the first network interface is repaired, wherein the second domain name server update includes the IP address.

2. The computer implemented method of claim 1, wherein the first and the second domain name server updates are secure domain name server updates.

3. The computer implemented method of claim 1, further comprising:
   responsive to detecting a new network interface added to the plurality of network interfaces, sending a third domain name server update that includes an IP address for the new network interface to form a new reachable IP address.

4. The computer implemented method of claim 1, wherein the first network interface is a network interface that is down or a network interface that cannot be used to reach a gateway.

5. The computer implemented method of claim 1, further comprising:
   responsive to a failure of the client to connect with the content server using an IP address for the content server, sending, from the client, a third domain name server update to the domain name server identifying the IP address for the content server.

6. An apparatus comprising:
   a content server comprising:
   a storage device connected to a bus, wherein the storage device contains a computer usable program product; and
   a processor unit, wherein the processor unit executes computer usable program code to:
   detect, by the content server, a failure of a first network interface of a plurality of network interfaces of the content server, wherein detecting the failure comprises receiving an interrupt signal from the first network interface, the interrupt signal indicating a hardware failure;
   determine, by the content server, an IP address associated with the first network interface, in response to detecting the failure;
   send, by the content server, a first domain name server update to a domain name server to notify the domain name server that the IP address is unreachable, in response to determining the IP address associated with the first network interface;
   send a second domain name server update to the domain name server indicating that the IP address is reachable in response to determining, by the content server, that the first network interface is repaired, wherein determining that the first network interface is repaired comprises determining that the first network interface is operable for connecting a client to the content server, and wherein the second domain name server update includes the IP address.

7. A system for updating a domain name server, the system comprising:
   a content server, wherein the content server determines an IP address for a first network interface of a plurality of network interfaces of the content server in response to detecting, by the content server, a failure of the first network interface, wherein the content server notifies a domain name server that the IP address is unreachable in response to determining the IP address for the first network interface, wherein detecting the failure comprises receiving an interrupt signal from the first network interface, the interrupt signal indicating a hardware failure, wherein the content server sends a domain name server update to the domain name server indicating that the IP address is reachable in response to determining, by the content server, that the first network interface is repaired, wherein determining that the first network interface is repaired comprises determining that the first network interface is operable for connecting a client to the content server, wherein the domain name server update includes the IP address.

8. The system of claim 7, further comprising:
the client computer, wherein the client computer notifies the domain name server that an IP address for the content server is unreachable in response to a failure to connect with the content server using the IP address for the content server.

9. A computer program product comprising:
a non-transitory computer storage medium including computer program code for updating a domain name server, said computer program product comprising:
computer program code for determining, by a content server, an IP address for a first network interface of a plurality of network interfaces of the content server in response to detecting, by the content server, a failure of the first network interface, wherein detecting the failure comprises receiving an interrupt signal from the first network interface, the interrupt signal indicating a hardware failure;
computer program code for sending, by the content server, a first domain name server update to a domain name server to notify the domain name server that the IP address is unreachable, in response to determining the IP address associated with the first network interface;
computer program code for sending, by the content server, a second domain name server update to the domain name server indicating that the IP address is reachable, in response to determining, by the content server, that the first network interface is repaired, wherein determining that the first network interface is repaired comprises determining that the first network interface is operable for connecting a client to the content server, and wherein the second domain name server update includes the IP address.

* * * * *